United States Patent [19]
Clarke

[11] Patent Number: 5,927,731
[45] Date of Patent: Jul. 27, 1999

[54] DOOR TROLLEY

[76] Inventor: John P. Clarke, 1301 El Camino, Ponca City, Okla. 74604

[21] Appl. No.: 08/704,324

[22] Filed: Aug. 28, 1996

[51] Int. Cl.[6] .......................................................... B62B 1/26
[52] U.S. Cl. ........................................ 280/79.7; 280/47.24
[58] Field of Search ................................. 280/79.1, 79.2, 280/79.3, 79.7, 47.34, 47.131, 47.24, 47.26; 414/10, 490

[56] References Cited

U.S. PATENT DOCUMENTS

| | | | |
|---|---|---|---|
| 2,503,388 | 4/1950 | Hedlund ................................. | 280/79.7 |
| 4,270,741 | 6/1981 | Hurst ..................................... | 280/79.7 |
| 5,288,090 | 2/1994 | Bross ..................................... | 280/79.7 |
| 5,378,103 | 1/1995 | Rolnicki et al. ........................ | 280/79.7 |
| 5,507,509 | 4/1996 | Della Polla, Jr. ...................... | 280/79.7 |
| 5,622,759 | 4/1997 | Fuster .................................. | 280/87.041 |

FOREIGN PATENT DOCUMENTS 2278811  12/1994  United Kingdom ................. 280/79.7

*Primary Examiner*—Richard M. Camby
*Attorney, Agent, or Firm*—Robert Treece

[57] ABSTRACT

A door supporting device comprising a low profile, compact, economically constructed frame made by bending a single flat piece of metal into four ninety degree bends; welding restricted to reinforcing of the ends, together with spot welding all threaded nuts to washers, and stems to rolling wheels; stabilizing said device by retracting its rolling wheels, allowing the entire width and length to make contact with the floor; and non-skid rubber on all contact points with the floor, to resist movement; desired movability and elevation of the door carrying service is adjustable.

11 Claims, 4 Drawing Sheets

DOOR TROLLEY

FIELD OF THE INVENTION

My invention relates to constructing a device that is less complicated, can be formed with bending machines common to the sheet metal trade, and is more affordable than the prior art of door hanging.

The principal object of my invention is to create a rolling device, to securely hold a door, while readily adapting to interruption of free movement to a position of stability, as if there were no rolling of the device.

It is a further object of my invention, to provide a low profile with a wide stance on my device, making a tool easily stored or transported.

Another object of my invention, when the device is in the non-rolling, stable mode; the door within the device is supported for planing, the installation of hinges and the like.

Another object of my invention is to service pre-hung doors, by providing a wide door pocket to receive doors with weather-strip attached.

DESCRIPTION OF THE PRIOR ART

Prior art of door hanging has the means to raise or lower a door within a device, to engage the hinge half on the door to its counterpart on the door frame, (Apr. 11, 1950, U.S. Pat. No. 2,503,388 -C. L. Hedlund). My device has this feature constructed in a more economical manner.

Further objects, advantages and features appear in the annexed specifications in which:

FIG. 1 shows a perspective view of one end of the invention showing diagonal welded brace 20.

FIG. 2 shows a perspective view of the opposite end of the invention.

FIG. 3 shows an elevational view of the end of the invention shown in FIG. 1.

FIG. 4 shows a top view of the invention showing design cutout 27 on Plane P- 10 and design 27 on Plane P-14.

FIG. 5 shows a cross sectional view of the invention taken on the line 5—5 of FIG. 4.

BRIEF DESCRIPTION OF THE DRAWINGS

Referring to the drawing FIG. 3 my device is comprised of five planes P-10, P-11, P-12, P-13, and P-14 forming the entire framework of said device from a single piece of metal. The bends that separate the five, equal in width, planes or areas. Planes P-10, P-12, and P-14 are preferably parallel and preferably run the length of the device. Similarly, planes P-11 and P-13 are preferably parallel and also preferably run the length of the device. The horizontal plane P-12 forms the bottom of the door pocket. Planes P-11 and P-13 are bent 90° to plane P-12 and form the vertical sides of the door pocket. Plane P-10 is bent outward from the door pocket, horizontally, making plane P-10 and plane P-11 equal in width and plane P-10 forming a 90° angle with respect to plane P-11. A similar 90° bend is made with plane P-13 and plane P-14, making the aforementioned planes equal and symmetrical.

The four bends, described above, are made from a single piece of flat metal, making a pocket for door, P-12 being the bed plate or bottom with P-11 and P-13 forming the vertical sides, while the top horizontal areas P-10 and P-14 support the adjustable casters 23A, 23B, 23C, and 23D.

Figure 4:
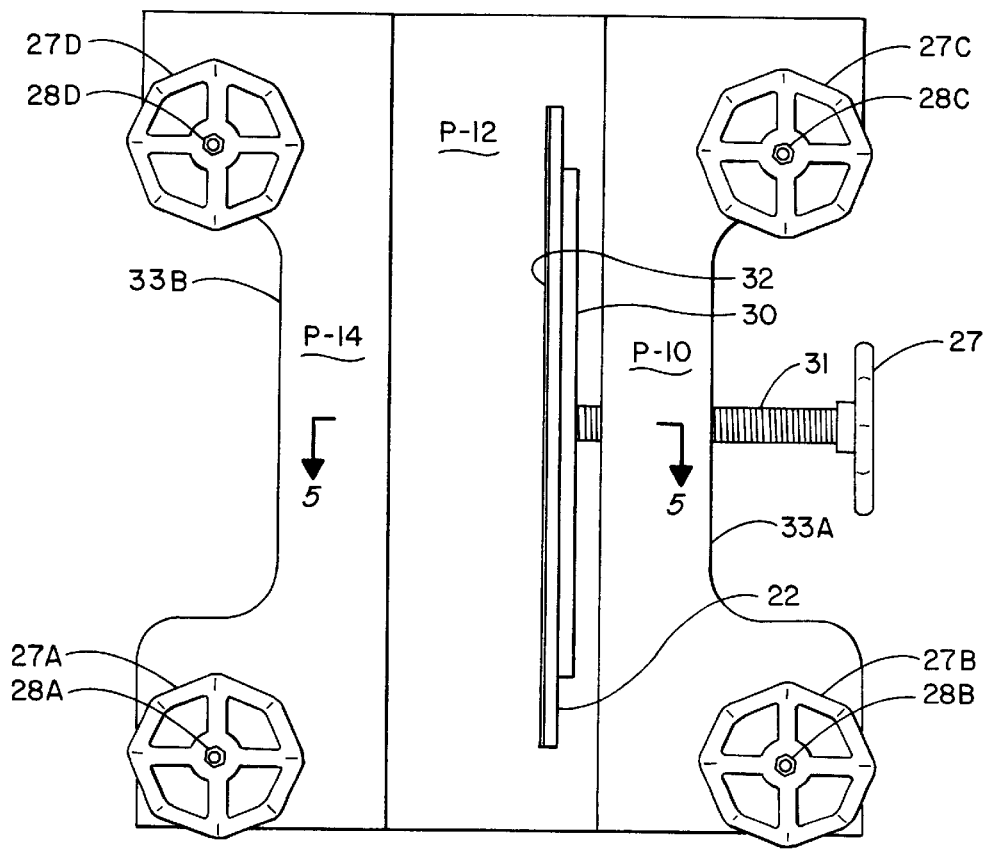
Figure 5:
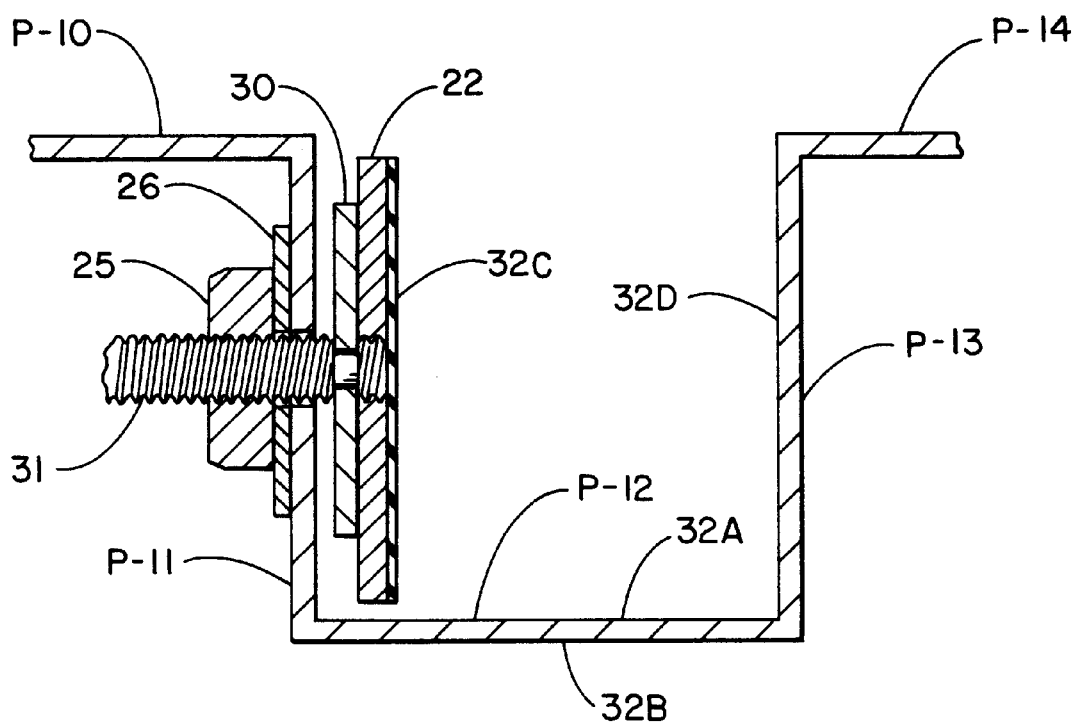
Figure 6:
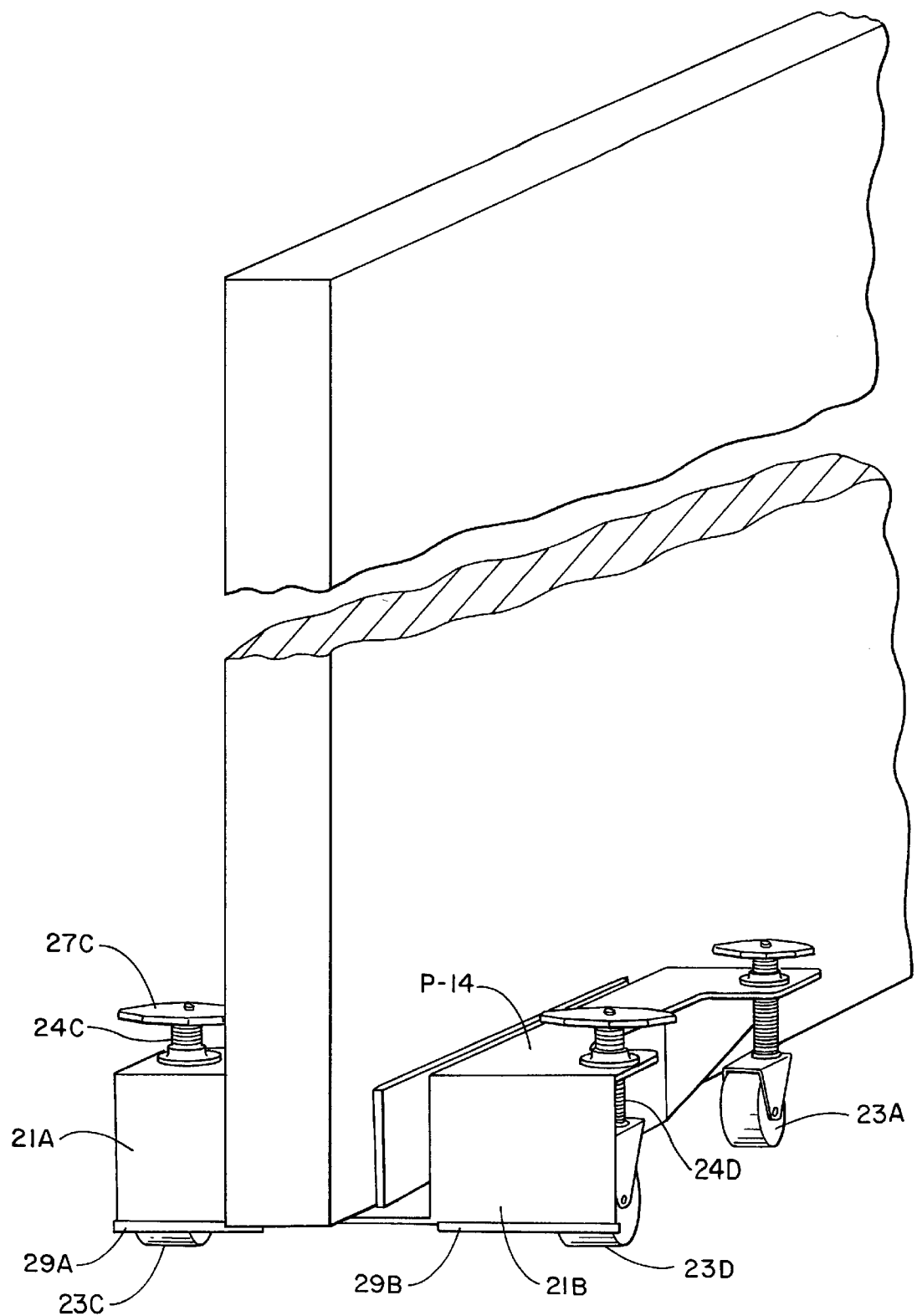

The clamping device shown in FIGS. 4 and 5 consists of a face plate 22 backed by a split stiffener 30 which is fitted to a notch in the threaded rod 31, and the area inside the door pocket is lined with rubber to protect all material secured by the clamp. All threaded rods such as 31 are fitted with a nut 25 welded to a washer 26, then pop riveted in position and each side of the bed plate P-12 is covered with rubber 32A and 32B. Rubber 32B on the bottom helps prevent forward movement when the door trolley is stabilized for planing a door or the bed plate needs security from scratching a finished floor.

Figure 1:
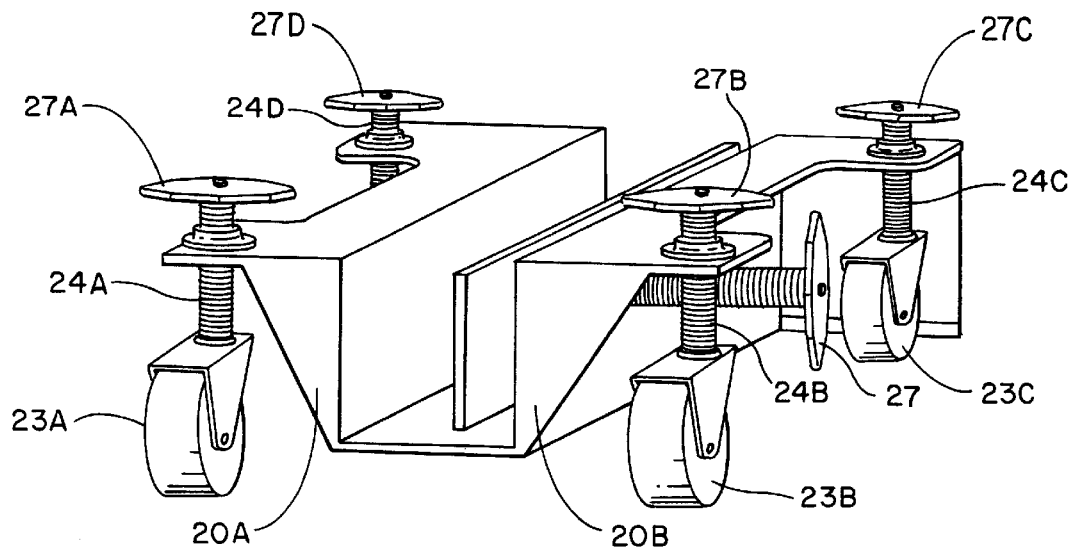
Figure 2:
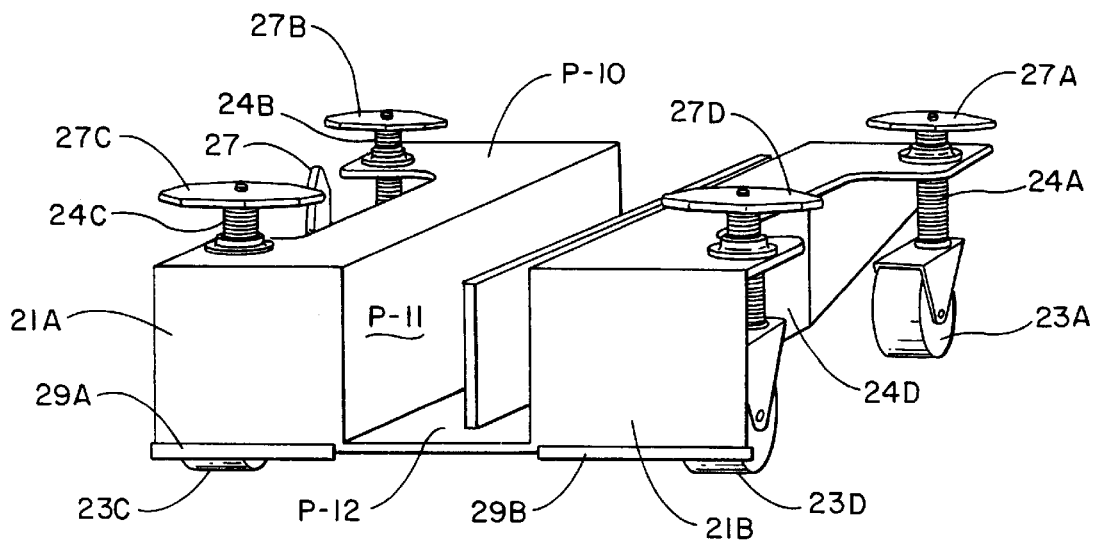
Figure 3:
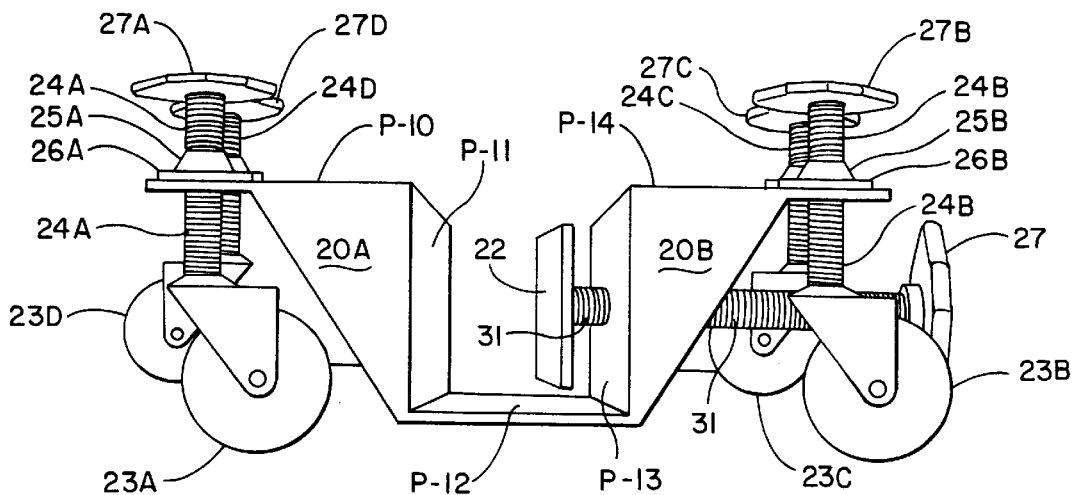

The wheels or casters shown in FIG. 3 have a long threaded shank 24A, 24B, 24C or 24D, running through a threaded nut (24A, 25B, 25C or 25D respectively) which is welded to a washer (26A, 26B, 26C or 27D respectively) that is pop-riveted to the outside corners of P-10 and P-14. With the round handles 27A, 27B, 27C and 27D, the wheels may be lowered to raise the bed plate well above the floor and by raising the wheels above the bed plate P-12 on both ends of the door trolley, the entire bed plate plus the entire width of box ends 21A and 21B shown in FIG. 2 rests on the floor, making a stable unit from side to side, that will not roll. The weight of the door is downward, engaging the non-slip rubber bottoms 29A and 29B on the box ends 21A and 21B of the door trolley. With the door trolley stabilized, planing, installing hinges and other work can be performed. On extra long doors, a second door trolley can be used, one it each end of the hinge edge or the lock edge or stile.

With hinges mortised and other functions accomplished, the door may be tilted to its final vertical mode by placing the boxed end 21 of the door trolley on the low corner of the bottom of the door, this allows the non-skid rubber 29 to protect the corner of the door and prevents its slipping. The door may then be rolled to position in the door frame, adjust wheels, with handles 27 to match hinge halves, install hinge pins, top pin first, center pin and then the bottom pin, release pressure on door clamp 22, slightly retract wheels 23 with handles 27 and slide out door trolley.

Having fully described my invention, it is to be understood that I do not wish to be limited to the details herein set forth, but my invention is of the full scope of the appended claim.

I claim:

1. A door trolley comprising:
   a frame with a length and a width, said frame having a pocket for receiving a planer member such as a door or sheet of plywood, and wherein said pocket has a bottom with a width and generally vertically disposed sides;
   a plurality of retractable wheels connected to the frame via a plurality of threaded shanks for lifting said frame up to allow the frame to roll over a surface on said wheels and for lowering the frame to rest on the surface;
   at least one non-slip bottom connected to said frame and extending to the widest points of said frame width for engaging a surface on which the frame placed when said wheels are retracted, and wherein said frame width extends beyond the threaded shanks; and
   a face plate retractably attached to one of the generally parallel vertically disposed sides for engaging a planer member when the plainer member is in said pocket.

2. The door trolley of claim 1 wherein the non-slip bottoms are rubber.

3. The door trolley of claim 1 wherein said pocket is lined with rubber to protect a planer member when secured in said pocket.

4. The door trolley of claim 1 further comprising: a threaded shank and handle connected to the frame and to each wheel for raising or lowering each wheel in relation to the frame by rotating the connected handle.

5. The door trolley of claim 1 wherein the pocket's generally vertically disposed sides allow a planer member placed in said pocket and to extend beyond the length of said frame in two directions.

6. The door trolley of claim 1 wherein said frame includes five planes bent from a single piece of material.

7. A method for making a door trolley comprising:

bending a single piece of metal into five planes with three planes being genrally horizontal and separated by two planes which are generally vertical; and connecting retractable wheels to two of the three generally horizontal planes.

8. The method of claim 7 further comprising the step of:

connecting two box ends to the frame, wherein each box end is connected a horizontal plane and a vertical plane.

9. The method of claim 8 further comprising the step of:

connecting a non-skid surface to each box end.

10. The method of claim 9 further comprising the step of:

connecting a non-skid surface to one of the three generally horizontal planes.

11. The method of claim 7 wherein the step of connecting retractable wheels to two of the three generally horizontal planes comprises:

creating a threaded hole for each wheel to be connected, said threaded holes being located in two of the generally horizontal planes;

screwing a threaded rod through each threaded hole;

connecting a wheel to each threaded rod; and connecting a handle to each threaded rod.

\* \* \* \* \*